United States Patent
Dudziak et al.

(10) Patent No.: US 8,032,165 B2
(45) Date of Patent: *Oct. 4, 2011

(54) ENTERPRISE INSTANT MESSAGE AGGREGATOR

(75) Inventors: Thaddeus Jude Dudziak, Pleasanton, CA (US); Biren Patel, Fremont, CA (US); Jerry Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,466

(22) Filed: Oct. 19, 2010

(65) Prior Publication Data

US 2011/0035591 A1 Feb. 10, 2011

Related U.S. Application Data

(62) Division of application No. 11/589,309, filed on Oct. 30, 2006, now Pat. No. 7,890,084.

(51) Int. Cl.
*H04W 4/00* (2009.01)
(52) U.S. Cl. ......... 455/466; 455/411; 455/415; 455/561
(58) Field of Classification Search .................. 455/411, 455/415, 466, 561
See application file for complete search history.

(56) References Cited

U.S. PATENT DOCUMENTS

| | | |
|---|---|---|
| 6,856,804 B1 | 2/2005 | Ciotta |
| 7,120,455 B1 | 10/2006 | Chen et al. |
| 7,240,836 B2 | 7/2007 | Vrotsos et al. |
| 7,328,046 B2 | 2/2008 | Koskelainen et al. |
| 7,403,972 B1 | 7/2008 | Lau et al. |
| 7,673,004 B1 | 3/2010 | Sherstinsky et al. |
| 2002/0128036 A1 | 9/2002 | Yach et al. |
| 2003/0105812 A1 | 6/2003 | Flowers, Jr. et al. |
| 2003/0130960 A1 | 7/2003 | Fraser et al. |
| 2003/0204741 A1 | 10/2003 | Schoen et al. |
| 2004/0088546 A1 | 5/2004 | Shah et al. |
| 2004/0117656 A1 | 6/2004 | Robert Tosey |
| 2004/0162076 A1 | 8/2004 | Chowdry et al. |
| 2004/0172531 A1 | 9/2004 | Little et al. |
| 2004/0198331 A1 | 10/2004 | Coward et al. |
| 2005/0048958 A1 | 3/2005 | Mousseau et al. |
| 2005/0114652 A1 | 5/2005 | Swedor et al. |
| 2005/0154876 A1 | 7/2005 | Buckley et al. |

(Continued)

OTHER PUBLICATIONS

Entire Prosecution history of U.S. Appl. No. 11/589,309 to Dudziak et al. entitled "Enterprise Instant Message Aggregator".

*Primary Examiner* — Pierre-Louis Desir
(74) *Attorney, Agent, or Firm* — McDermott Will & Emery LLP

(57) ABSTRACT

A disclosed enterprise instant messaging (IM) service aggregator enables validation of mobile stations and/or users for enterprise IM service through a wireless communication network; and in the examples, the enterprise IM service provides a secure messaging environment that allows IM traffic to/from wireless mobile stations. The security offered may be unique to and controlled by each enterprise, for example, by enabling each enterprise to generate its own encryption key for distribution through the aggregator and by allowing mobile stations to generate their own keys for distribution back through the aggregator to the enterprise IM servers. As disclosed, the login credentials are encrypted from the mobile station to the enterprise IM server. The use of standard encryption methods within the call flows allows a simple method of ensuring that only authorized users can access the enterprise servers and that the messages will be encrypted by the strongest possible means.

8 Claims, 3 Drawing Sheets

U.S. PATENT DOCUMENTS

| | | |
|---|---|---|
| 2006/0009243 A1 | 1/2006 | Dahan et al. |
| 2007/0094337 A1 | 4/2007 | Klassen et al. |
| 2007/0162554 A1 | 7/2007 | Branda et al. |
| 2007/0174399 A1 | 7/2007 | Ogle et al. |
| 2008/0069315 A1 | 3/2008 | Tanigawa et al. |
| 2008/0085728 A1 | 4/2008 | Reding et al. |
| 2008/0176541 A1 | 7/2008 | Cunningham et al. |
| 2009/0005040 A1 | 1/2009 | Bourne |

ENTERPRISE INSTANT MESSAGE AGGREGATOR

RELATED APPLICATIONS

This application is a Divisional of U.S. Ser. No. 11/589,309, now U.S. Pat. No. 7,890,084, filed on Oct. 30, 2006, the disclosure of which Application is incorporated by reference herein.

TECHNICAL FIELD

The present disclosure relates to techniques and equipment to aggregate enterprise instant message traffic for wireless client devices.

BACKGROUND

Instant Messaging (IM) is the delivery of text or other media messages between two users in near-real time. IM allows a user to maintain a buddy or contact list, listing people with whom the user might exchange instant messages. The user selects a person from the list that is currently logged-in with respect to the IM service and establishes a data communication session with a remote device being used by the selected person. In a personal computer type implementation, the IM software on the user's device opens a window on the computer display. Typically, the window includes two parts, each of which provides a slightly different functionality. One part of the window allows the user to type messages for transmission to the remote user device, whereas the other part receives messages from the remote user device and displays those messages to this user. The remote user's device will provide similar input and display functions, and in this way, both users can read what the other has typed.

Originally, IM service was offered as a text messaging service between users' computers connected to the Internet. However, as the popularity of IM services grew, the IM service offerings were extended to users of wireless mobile devices, such as cellular telephones, wireless email devices and personal digital assistants (PDAs). U.S. Pat. No. 7,120,455 to Chen et al., for example, discloses a technique for mobile instant messaging, particularly adapted to provide interfaces to a number of different IM systems or communities. However, these communities are those served by commercial IM providers, such as AIM, MSN, Yahoo IM or the like.

Much of the IM traffic today is between individual users/customers, for example, to permit chat between friends and family members. However, enterprises have found that the real time text communication offered by IM services also provides a valuable collaborative tool between enterprise personnel, in the context of a wide range of commercial, educational and governmental activities. IM services typically involve text communication; but increasingly, such communications can communicate a variety of other types of information media, such as voice, images and video in near real time, both in private IM services and enterprise IM services. Hence, enterprise IM typically entails the delivery of text or other media messages between two enterprise users in near-real time.

Use of IM by enterprise personnel, however, raises a number of unique concerns. The overriding concern is security. Many of the IM messages between enterprise personnel may contain highly confidential information of the enterprise, and the enterprise has an attendant need to prevent misdirection or interception of the messages.

US application publication no. 2003/0204741 to Schoen et al. proposed a secure public key infrastructure type proxy for instant messaging clients. The publication describes an encryption technique. Although the publication recognizes the need of businesses and government entities for security, the encryption is apparently implemented in a non-corporate environment utilizing commercial IM services. For example, the publication suggests public key infrastructure proxies may be implemented on the IM servers and client devices themselves. There is no mention of how the IM service would be extended securely into the wireless domain, that is to say to wireless mobile client devices.

In actual practice, enterprise IM services have been deployed using one of two approaches. One approach is for the Enterprise IT policy to allow the use of commercial IM services such as Yahoo, AIM and MSN. These services are readily available but do not have secure messaging capability.

The other, more secure approach used to date in actual deployments implements the enterprise IM service within the enterprise environment, from desktop to desktop. IM traffic can be readily sent within existing messaging environments such as IBM Lotus Instant Messaging (Sametime) and Microsoft Office Live Communications Server (LCS). These messaging environments only support IM within their platform or community and do not extend IM onto other messaging environments including commercial IM services such as Yahoo, America On-Ling IM and MSN communities. Security includes encryption of user credentials (user name and password), message content and logging of conversations. Also, in these secure enterprise IM environments, the IM messages are prohibited from going to or coming from a wireless device.

Hence, there is a need for a technique to extend secure IM service for an enterprise to wireless devices that may participate in IM sessions via a public mobile or wireless communication network. Clearly, the security for the enterprise IM message needs to be extended to the wireless device, including through the wireless network that provides communications with the wireless/mobile device.

SUMMARY

An aggregator in a wireless communication network aggregates IM traffic for a number of enterprise IM communities and aggregates IM traffic with respect to mobile stations of users associated with each of those enterprise IM communities. The aggregator facilitates security on the IM communications with the mobile station.

The enterprise IM service aggregator in the detailed examples below provides a mechanism to validate mobile stations and/or mobile station users for the service through the wireless communication network. In the examples, the enterprise IM service provides a secure messaging environment that allows IM traffic to/from a wireless mobile station. The security offered may be unique to and controlled by each enterprise, for example, by enabling each enterprise to generate its own encryption key for distribution through the aggregator and/or by allowing mobile stations to generate their own keys for distribution back through the aggregator to the enterprise IM servers. Also, the key exchanges are encrypted. For example, the Login Credentials are encrypted from the mobile station to the enterprise IM server. The use of standard encryption methods within the call flows allows a simple method of ensuring that only authorized users can access the enterprise servers and that the messages will be encrypted by the strongest possible means. The messages can not be decrypted unless the keys are previously known. This ensures that anyone that attempts to access the messages from the wireless environment can not decrypt the messages or the login credentials of the enterprise community.

The examples disclosed below also facilitate provisioning of a mobile station for use of the enterprise IM service through the wireless communication network, e.g. when the aggregator determines that a mobile station or user are not yet authorized for the service.

The enterprise IM service aggregator may also offer a 'KILL' feature, by which an enterprise can direct the aggregator to terminate service to a particular mobile station, e.g. upon determination that the station has been stolen. The 'KILL' function causes the network to disable the service on the mobile station, and in the example, this function causes the aggregator to send a message through the network to the stolen mobile station instructing that station to delete all stored IM messages and/or any IM service credentials that have been stored in the mobile station.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
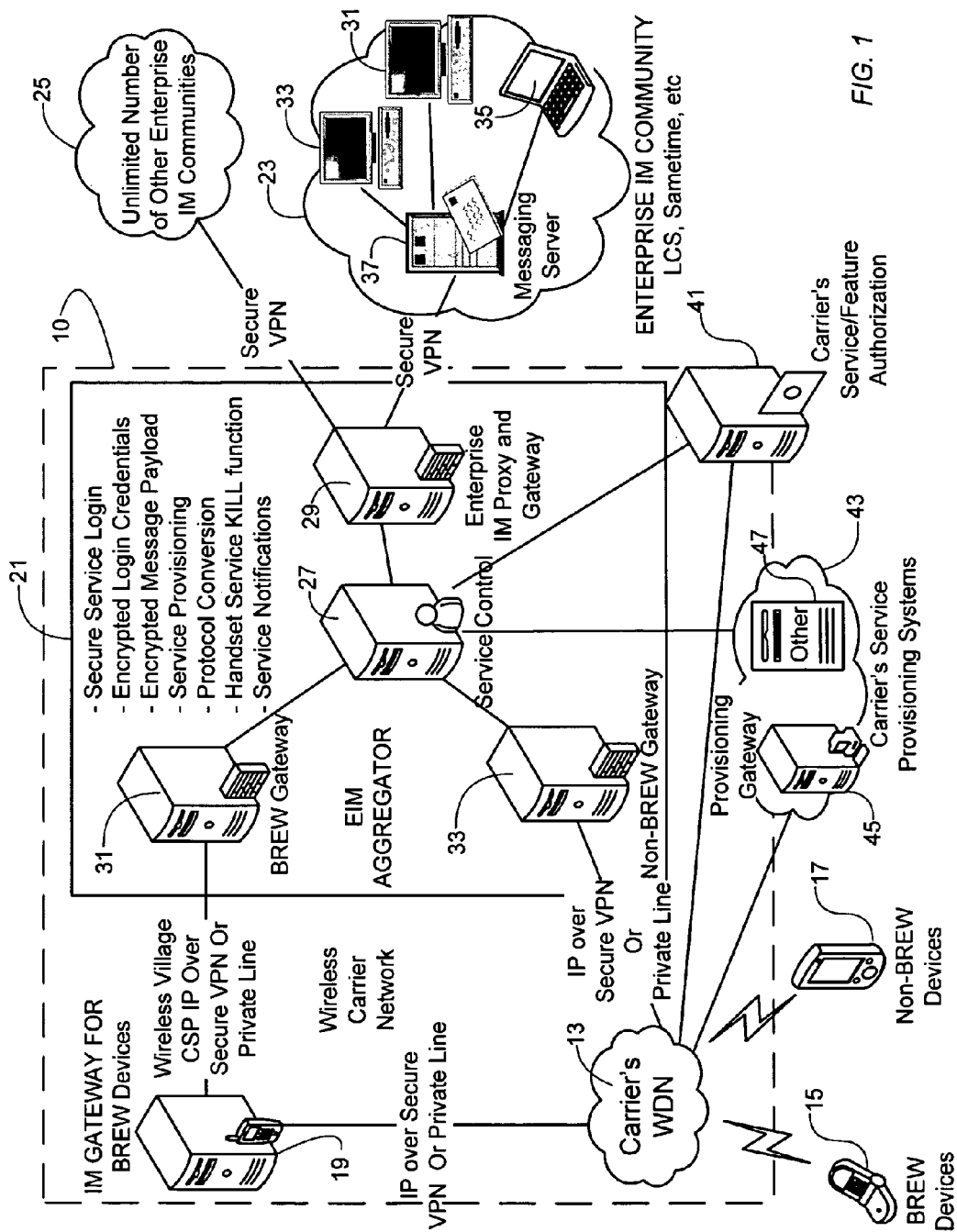
FIG. 1 is a high level functional block diagram of a wireless carrier's network that may offer the secure instant messaging service through an aggregator, to a number of the carrier's enterprise customers.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

For purposes of the detailed description here, enterprise IM is the delivery of text or other media messages between two enterprise users in near-real time. For enterprise security, users typically will be restricted to the same enterprise community and in general will not have access to commercial IM communities for business related IM. However, a wireless network operator/carrier or other service provider will provide a mechanism/service/procedure to extend the IM communications to wireless devices and provide the requisite security for enterprise IM communications to/from the wireless devices.

The Enterprise Instant Messaging (EIM) service is deployed in a public wireless telecom network, and the network operator or carrier offers the service to its enterprise customer base. The carrier-centric deployment model uses an Instant Messaging aggregator, to aggregate connections from various enterprises. The EIM service, using the traffic aggregator, provides secure IM to mobile stations using a combination of encryption and trusted connection of service elements. The aggregator provides a single interface to the wireless telecom network. The aggregator provides a means of allowing IM traffic from an enterprise secure server environment to wireless devices, such as mobile handsets and PDAs. The enterprise server environment will reside in a single or multiple locations and is often referred to as a community. The aggregator provides all the necessary protocol conversations to allow IM traffic between an IM community server and a wireless mobile station. These protocols are those that are native to both the wireless handset and the enterprise IM community server. The aggregator also provides all the necessary protocols to the wireless network. The aggregator also provides all the necessary routing of IM traffic to the authenticated wireless device user.

The aggregator also provides other features necessary to meet the requirements of each enterprise customer's IT policy and wireless network, such as one or more of the following:

Secure login into the IM server environment

Secure processing of all user login and IM server information to setup the traffic path Secure transmission of the IM payload between the wireless device and the IM server using standard encryption methods Secure access to the IM service by authenticating the user first to the wireless network and second to the IM server Administrative functions such as white list/black list of users and handset "kill" function to disable the service on the mobile station Provisioning of the service on the wireless network.

With that overview of the exemplary Enterprise Instant Messaging (EIM) service, it may be helpful now to consider a possible implementation example in more detail with reference to the accompanying drawings.

FIG. 1 is a functional block diagram, illustrating elements of a wireless carrier's network 10 that may offer the EIM service to a number of the carrier's enterprise customers and illustrating some of the enterprise customer equipment. At a high level, the carrier's network 10 includes a wireless data network (WDN) 13 for providing mobile wireless communications services to any number of mobile stations. Although the WDN 13 allows the carrier to offer services to individual customers (whose devices are omitted for convenience), for purposes of this discussion, the WDN network 13 provides wireless communication service to mobile stations of personnel of one or more enterprise customers. In the drawing, the mobile stations of the enterprise personnel are represented by the mobile stations 15 and 17.

The WDN 13 may be any of a number of currently available public wireless/mobile communication networks, which often offer various combinations of voice telephone services and packet-data communications services. For example, the WDN 13 might be implemented as a network conforming to the IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications that offer the packet data transport used for instant messaging. The mobile stations 15 and 17 may be capable of conventional voice telephone communications. However, for EIM, the mobile stations 15 and 17 have IP packet data communication capabilities, and the WDN network 13 provides wireless IP packet communications to and from each of the mobile stations 15 and 17. A variety of different types of mobile stations supporting such communications are widely available. Those skilled in the art should be familiar with the general structure and operation, both of the mobile stations and the wireless networks, therefore more detailed description thereof should be unnecessary here.

Mobile station 15 is a BREW device, that is to say a mobile station device that utilizes Qualcomm's Binary Runtime Environment for Wireless operating system. BREW can be considered an environment that allows general purpose applications to be written for mobile stations. Such applications are easily installed in the mobile stations, including via wireless download through the WDN network 13. Of note for purposes of this discussion, the mobile station 15 of the enterprise employee will have a BREW compatible application loaded therein to configure the device 15 to perform the functions and provide the appropriate user interface for instant message type communications.

In the example, the carrier normally supplies BREW type mobile telephone devices like the mobile station 15 to its regular telephone service subscribers. The WDN network 13 provides telephone and packet data service, including packet data service in support of IM. The carrier also operates or provides access to a gateway server 19 to support IM type services for its regular subscribers. This gateway 19 is the primary instant messaging interface for BREW devices through the network 13. The IM gateway 19 provides the IM protocols necessary to provide IM services to BREW devices. It can be a separate service provider or it can be part of the aggregator. Putting it outside the aggregator function as in the example illustrates and highlights a protocol conversation function of the aggregator.

Mobile station 17 is a non-BREW device, that is to say a device that utilizes an operating system other than BREW, although such operating systems often allow general purpose applications to be written for the device in a manner somewhat similar to BREW. These devices include PDA's, Smartphones, and other mobile computing devices that perform the same functions as a desktop or laptop computer but that still may use the WDN network 13 for packet data communications. As discussed more below, the carrier provides enterprise IM service to/from the mobile stations 17, as well.

To provide the secure EIM service, the carrier network 10 includes an enterprise instant message (EIM) aggregator 21, to aggregate connections from various enterprises 23, 25 that obtain IM service from the particular carrier or service provider that operates network 10. The EIM service, using the traffic aggregator 21, provides secure IM to mobile stations 15, 17 that have been designated as members of an enterprise community, e.g. of enterprise community 23. The aggregator 21 includes a Service Control server 27. The Service Control server 27 performs all the necessary functions relating to login and message encryption, protocol conversion and control of access to the EIM service. The Service Control server 27 may be implemented on a general purpose computer having packet switched data communication capabilities and/or by a combination of a router and a programmable control/processor, configured to implement the control and security functions outlined below.

Each enterprise will operate its own systems to provide various communications, including secure IM, within its own respective domain or premises. Each IM community typically is comprised of an Instant Messaging Server and numerous IM clients that are resident on a variety of computing and local wireless devices. These devices include desktop computers and workstations, laptop computers, Personal Digital Assistants (PDAs), and mobile/handheld computers. The aggregator 21 allows the extension of the IM community to cell phones and PDAs as well as other wireless computing devices, represented by the mobile stations 15 and 17.

Consider the community 23 by way of an example. There, users in the enterprise IM community will have various client devices, represented generically by the desktop computers 31 and 33 and the laptop computer 35. The enterprise will provide packet data communications to/from these and other data devices within the enterprise premises, using any desirable wired or wireless communication technologies. For IM communications, the enterprise will also operate its own IM server 37. The IM server 37 provides user/device authentication and encryption key management for security. Presence information indicating which enterprise users are currently on-line for the IM communications typically is exchanged via the IM server 37. The IM server 37 typically participates in the IM message exchange between IM client devices, 31, 33, 35, although it is possible that some implementations might utilize a peer-to-peer communication for the actual message exchanges.

The aggregator 21 includes a number of gateway servers. The gateway servers, 29, 31 and 33 may be implemented on appropriate routers and/or computers having packet switched routing capabilities and sufficient intelligence to implement associated security functions, such as firewall and/or proxy functions as outlined below. Connectivity to the gateway servers in the aggregator 21 can be made using a Secure VPN or a Private Line. Each of these gateway servers provides a high level of security in and of itself. A secure VPN establishes a connection over the Internet. The Internet connection is not considered secure by itself. Establishing a VPN ensures a secure connection between the aggregator and the other server. The use of a private line makes use of dedicated connection from the aggregator to the other server. Common implementations of private lines include T1 and Fast or Gigabit Ethernet.

In the example, a gateway server 29 provides the VPN interface to the enterprises 23, 25. For example, there is a secure VPN link between the IM server 37 of the enterprise community 23 and the gateway server 29. The gateway server 29 implements proxy and firewall functions, to protect the aggregator 21 and the network 10 from any malicious traffic that otherwise might enter from the enterprise community 23 or from any of the enterprise communities 25.

Another gateway server 31 provides the secure interface for IM communications that pass through the IM gateway 19 for BREW Devices. In the example, the link between the gateways 19 and 31 uses the Wireless Village Client Server Protocol (CSP) IP over a secure VPN or private line. If the carrier's WDN network 13 supports non-BREW devices 17, then the aggregator 21 includes a gateway server 33 having a secure VPN or private line type link with the WDN 13 for IP traffic to/from such mobile stations 17. The gateway servers 31, 33 provide messaging protocol translation from the Service Control server 27 to servers outside the aggregator 21. Each gateway server 31, 33 implements a firewall functionality, to protect the aggregator 21 from potentially harmful or disruptive traffic that might otherwise enter via the respective interface.

The aggregator 21 can be thought of as the "traffic cop" for the service, as it is the focal point for all the necessary service functions. The aggregator 21 implements a secure environment so that the wireless device 15 or 17 can provide an IM capability within the enterprise community, that is to say in the one community 23 with which the particular mobile station(s) 15 or 17 is affiliated. The service control element 27 performs these and related functions. The gateways 29, 31 and 33 provide the secure interfaces to the various messaging paths. The list of functions of the Service Control 27 may include:

Secure Service Login
    Encrypted Login Credentials
    Encrypted Message Payload
    Service Provisioning
    Protocol Conversion
    Handset Service KILL function
    Service Notifications To control service and/or features that the network 10 may provide to the various customers of the carrier, the network will typically include one or more systems for validating the mobile stations and/or their users to receive specific services or access specific features. Hence, in the example, the network 10 includes a system 41 for service/feature authorization. The service feature authorization may be implemented in association with authentication and accounting functions, for example, in the form of a AAA (Authentication, Authorization and Accounting) server, in association with billing functions implemented by EDR (Electronic Data Reporting) or the like, or in a number of other forms commonly found in wireless networks. Of note for purposes of the present discussion, the service control 27 in the EIM aggregator 21 will interact with the authorization system 41 as necessary, to determine that each mobile device 15 or 17 is authorized to use the EIM service, each time that a user of either station requests access to an enterprise for IM communication.

The carrier that provides services through the network 10 also operates its own system or systems 43 for provisioning the network elements and/or mobile stations of its customers for mobile station operation through the network 10. For example, when a new mobile station is activated, the provisioning system 43 typically loads some necessary information or programming into the mobile station, such as its assigned mobile directory number (MDN), and the provisioning system 43 loads an appropriate service profile record into the system 41 that will control service/feature authorization for that device, essentially to authorize the new mobile station to access particular network services and features. The example shows a provisioning gateway 45 and one or more other service provisioning systems 47. The provisioning gateway 45 provides a web interface or the like at which a user of a mobile station 15 or 17 can interact with the provisioning system(s) 47, to provision selected services or features offered to the mobile stations via the WDN network 13. Of note for purposes of the present discussion, the service control 27 in the EIM aggregator 21 may instruct the user to access the provisioning systems 43, e.g. via the provisioning gateway 45, as part of the initial set-up of mobile devices 15, 17 for the EIM service.

In general, the features of the EIM service may include:
    Secure Service Login to the Enterprise and the wireless network
    Validation of the handset to the wireless network to avoid spoofing from unauthorized handsets
    Encrypted Log In Credentials to the Enterprise community
    Encrypted Message Payload from the wireless handset to the Enterprise community: End-to-end encryption
    Service Provisioning in the wireless network
    Protocol Conversions between the wireless handset and the Enterprise community
    Handset Service KILL functions to remove all messages and credentials that are on the handset if the handset should be lost or stolen
    Service Notifications from the aggregator to the wireless handset that inform the user of significant service notices One of the features of the EIM service, as outlined above, is the Service KILL function. This function utilizes wireless network short message service (SMS) wake up to erase all messages and user credentials if the enterprise directs the carrier to terminate service to a particular mobile station, e.g. if a handset should be lost or stolen. Essentially, personnel of the enterprise will cause the IM server 37 to send a KILL message to the service control 27 in the aggregator 21 identifying the stolen mobile station. Assume for this discussion that the stolen mobile station is station 15. The KILL message identifies the particular mobile station 15, and in response, the service control 27 will transmit a SMS type message through the WDN network 13 to that mobile station 15 instructing the station to wake-up the IM application on that station. The SMS message will also provide an instruction to the IM application to erase all messages and user credentials stored within that mobile station 15. The service control 27 will also notify the provisioning system(s) 47 to deactivate service to the mobile station 15, for example, by deleting any associated profile data from the authorization system 41 and/or by sending another message to the mobile station 15 to delete any provisioning data for at least the IM service, which may be stored in the mobile station itself.

Figure 2:
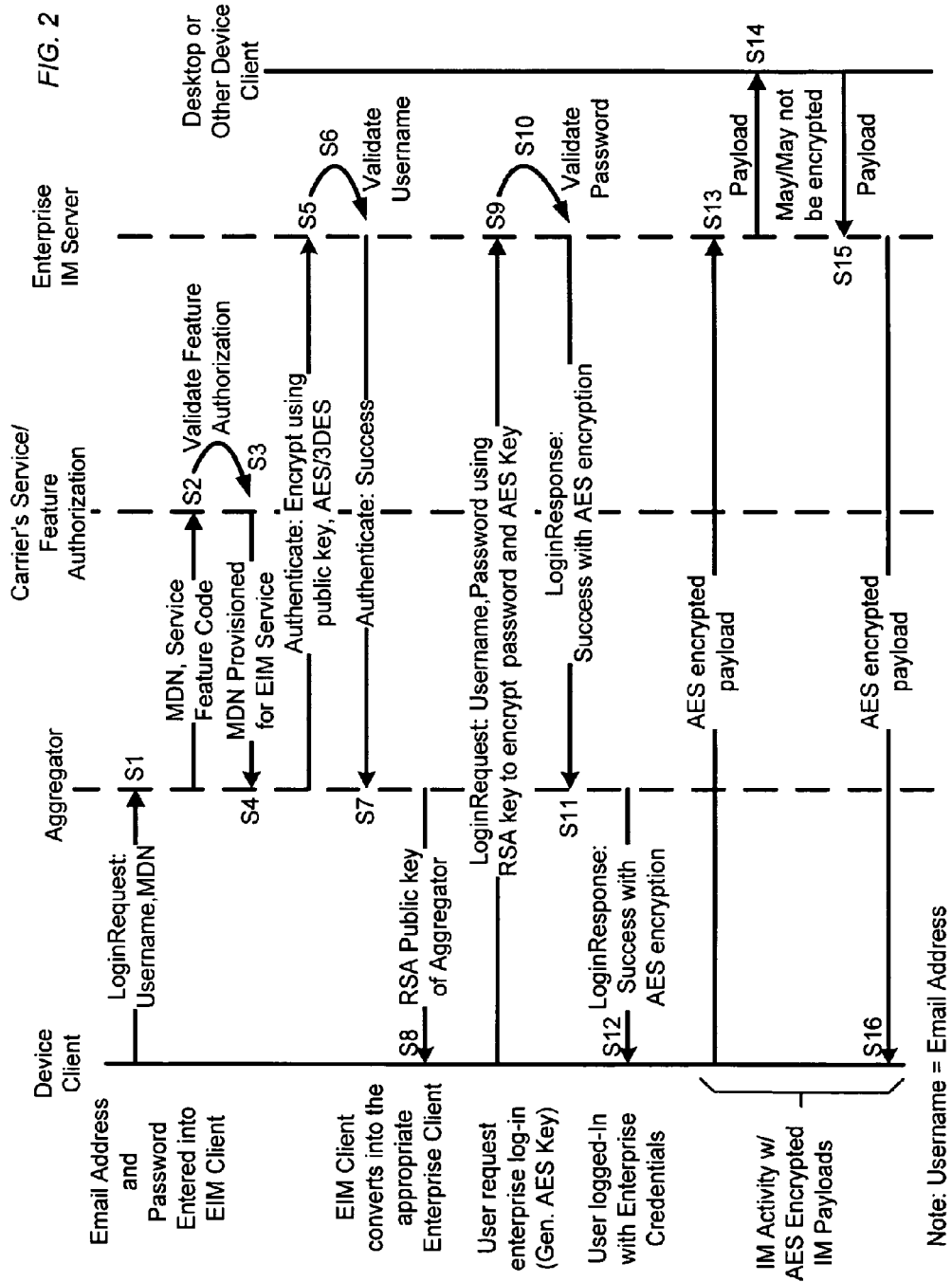
FIG. 2 is a signal flow diagram illustrating a procedure for establishing and conducting an enterprise IM session through the aggregator.

It may be helpful at this point to consider an example (FIG. 2) of a call or signal flow, as an example of the processing of an IM communication session facilitated through the aggregator 21.

The example of an EIM communication begins after the user has activated the appropriate IM communication client application on the user's mobile station 15 or 17. The device client application provides an appropriate display, and in response, the user inputs the user's email address and password into the client application. The email address is used as a username in this example. In response to the user input, the device client sends a log-in request to the aggregator 21 (at step S1). The client application enables the mobile station to address this initial request message to the aggregator 21. Although not separately shown in the call flow diagram, the login request message communication would involve one or more packet transmissions through the carrier's WDN network 13, possibly the gateway 19 (if the mobile station is a BREW device) to one of the gateways 31, 33 in the aggregator 21, which in turn forwards the message packet(s) to the service control 27.

The aggregator will validate the wireless handset to ensure that the handset accessing the service is authorized to do so. The request message from the device client will include information about the mobile station as well as the user, for example, the mobile directory number (MDN) assigned to the particular mobiles station 15 or 17 as well as the username (email address). Typically, this message also includes the password entered by the user. To perform the validation, the service control 27 uses information from the login request to formulate an authorization query, essentially a request to determine if the user's mobile station is authorized for the EIM service through the carrier's network 10. At step S2, the service control 27 in the aggregator sends this authorization query to the element 41 that performs the carrier's service authorization function. The element may be an AAA server, an EDR unit in the billing center or other designated system.

The authorization query identifies the mobile station by its MDN and includes a feature code essentially to identify the EIM service that the user is attempting to access. The carrier's service/feature authorization element uses the MDN to lookup a service profile for the particular mobile station 15 or 17, and it uses the feature code to determine whether or not the profile shows that the particular mobile station is authorized to access the EIM service via the network 10 (step S3). This authorization check may involve checking of a number of other parameters. The authorization element can check the domain portion of the user name/email address to confirm that the domain corresponds to an enterprise that subscriber to the EIM service for mobile stations through the network 10. The authorization element can also check that the particular user is authorized for the EIM service based on the combination of username and password. In this example, we will assume that validation at S3 is successful. For example, the user's mobile station is authorized to use the EIM service, the domain name portion of the username (email address) is that of an enterprise community served by the aggregator 21, and the username/password identify a valid user of the EIM service.

Based on the result of the authorization determination at S3, the carrier's service/feature authorization element will respond to the initial query message (from step S2). In this example, since the mobile station is authorized to use the EIM service, the authorization element sends back a message (at S4) informing the service control 27 in the aggregator 21 that the MDN (and thus the particular mobile station) is provisioned for the EIM service. This may also effectively confirm that the domain is that of a valid EIM enterprise and that the particular user is authorized service through the network (entered a valid password associated with the username).

As noted above, the initial login request at S1 included the username, which is the user's email address. The email address includes a domain name following the @ symbol, which corresponds to the enterprise community to which the user is attempting EIM access. Based on that domain name, the service control 27 in the aggregator can determine the address for the messaging server of the particular enterprise, such as the server 37 of the enterprise community 23 in the example of FIG. 1. Using that address, the service control 27 in the aggregator responds to the determination that the mobile station is provisioned through the network for the EIM service by launching an authentication query (step S5) through the gateway 29 to the appropriate enterprise server (server 37 in our example), requesting that the particular IM server authenticate the user for IM communications with the associated IM community 23.

The authentication query sent to the enterprise IM server 37 in step S5 is encrypted. In the example, the service control 27 in the aggregator has previously received a public encryption key from the enterprise IM server 37. The example uses Advanced Encryption Standard (AES) encryption or Triple Data Encryption Algorithm (3DES or TDES) encryption. Hence, the service control 27 in the aggregator uses the AES or 3DES public key of the enterprise IM server 37 to encrypt the authentication query. Each enterprise will provide its public key (and possibly identify the particular encryption algorithm) when the enterprise signs-up with the carrier for the EIM service through the network 10. The keys may be changed from time to time, in which case the respective enterprise server will provide an updated public key to the carrier, for use by the aggregator 21.

The encrypted authentication query contains the username. The enterprise IM server 37 uses its AES or 3DES private key to decrypt the query and recover the username. The enterprise IM server 37 then checks its database of user information to check the validity of the received username (step S6). In the example, we have assumed that the username is valid, therefore the validity check at S6 is successful; and at S7, the enterprise IM server 37 sends back a response message indicating the successful validation of the username.

In response to receipt of the message indicating the successful validation of the username, the service control 27 now sends back (S8) its response to the initial login request (its response to the request it received at S1). The response message goes back through the gateway and the WDN network 13 to the device client application running in the user's mobile station 15 or 17. The message indicates successful completion of the request processing through the network 10. The service control 27 also supplies the RSA (Rivest, Shamir and Adleman) public encryption key of the aggregator 21 to the device client in the mobile station, as part of the response message sent in step S8.

When the device client was initially activated (prior to sending the login request at S1), that client was generic to data service through the carrier's network 10. However, based on the response at S8, the device client becomes a specific client program for EIM service through the network with the particular enterprise server, in this example, the server 37. Hence, at step S9 the device client causes the mobile station to form a login request for the particular IM server 37. This request contains the username and a password. The password may be the same as at S1 (for network validation) or a second password for enterprise validation. The enterprise login request message also contains an AES key, which is generated by the device client. The mobile station encrypts the enterprise login request message using the RSA public key of the aggregator 21. At step S9, the mobile station sends the encrypted enterprise login request message through the network 10 to the IM server 37 of the enterprise community. The aggregator 21 provides routing, via the appropriate gateways, however, the aggregator passes the message through transparently, e.g. without decrypting the message.

The carrier will have supplied the matching RSA private key of the aggregator to the enterprises that subscribe to the EIM service. Hence, the enterprise IM server 37 will use that key to decrypt the login request that it receives in step S9. In this way, the enterprise IM server 37 will recover the username and password, and it can validate the password for the respective username (step S10) based on its own internal user profile records. In the example, it is assumed that this validation also is successful. Hence, the server at the enterprise responds with a message (S11) indicating successful authentication, which it encrypts using the AES encryption algorithm and sends back to the aggregator 21 for forwarding (S12) to the device client in the mobile station 15 or 17. Although shown as two separate steps (S11 and S12), the routing through the aggregator 21 actually may be considered as a single step (like that of S9) since the aggregator passes the response message through transparently, e.g. without decrypting the message.

The user of the mobile station can now initiate an IM communication with another member of the enterprise IM community. The enterprise IM server 37 supports session set-up between users in a conventional fashion. The other client participating in the IM session may be a device within the enterprise domain, e.g. at one of the devices 31-35, or the other client may be another mobile station that is on-line (has successfully completed the login procedure as outlined above). Actual IM communication may subsequently ensue. Steps representing a single two-way exchange of messages with a party at the enterprise are shown for simplicity, although those skilled in the art will recognize that the subsequent IM communications may include any number of message transmissions.

In the example, the user of the mobile station enters text or other information for an IM message, and the device client encrypts that information using the AES key. At step S13, the mobile station sends the AES encrypted IM payload through the network 10 to the IM server 37. The network 10, including the aggregator 21, is transparent to this message. Although the message is routed through the aggregator, for security, the aggregator 21 does not decrypt the message. The IM server 37 at the enterprise passes the IM payload to the appropriate device client in the enterprise community (step S14). Depending on how the enterprise implements its IM communications, the server may decrypt the payload before communication to the device client, or the server may pass the payload on in encrypted form for decryption by the device client. The device client of the receiving party processes the message and presents the IM message to the user at the receiving end, in a normal manner.

The device client of that second party also offers that party a user interface for entering and sending a response. In the example, that user now enters text or other information for an IM message, and the device client sends that responsive IM message payload back to the server 37 via the enterprise network facilities (step S15). The payload may be encrypted by the client. If not, the enterprise server 37 uses the appropriate AES key to encrypt the payload and sends the payload back to the gateway 29 at the aggregator 21. The aggregator forwards the payload through the appropriate gateway to the WDN network 13, which delivers it to the mobile station and thus to the mobile user's device client. Although the message at S16 is routed through the aggregator 21, for security, the aggregator does not decrypt the message. The device client in the mobile station decrypts the payload and presents the IM message to the user at the receiving end, in a normal manner.

As shown, the EIM service provides end-to-end message payload encryption. The actual EIM messages are encrypted at least between the mobile station the enterprise IM server. Also, the key exchanges are encrypted. For example, the enterprise login credentials (username, password, and AES key) are encrypted from the mobile station to the enterprise IM server (see S8 and S9). The use of standard encryption methods such as RSA and AES/3DES within the call flows allows a simple method of ensuring that only authorized users can access the enterprise servers and that the messages will be encrypted by the strongest possible means. The messages can not be decrypted unless the keys are previously known. This ensures that anyone that attempts to access the messages from the wireless environment can not decrypt the messages or the login credentials of the enterprise community.

Figure 3:
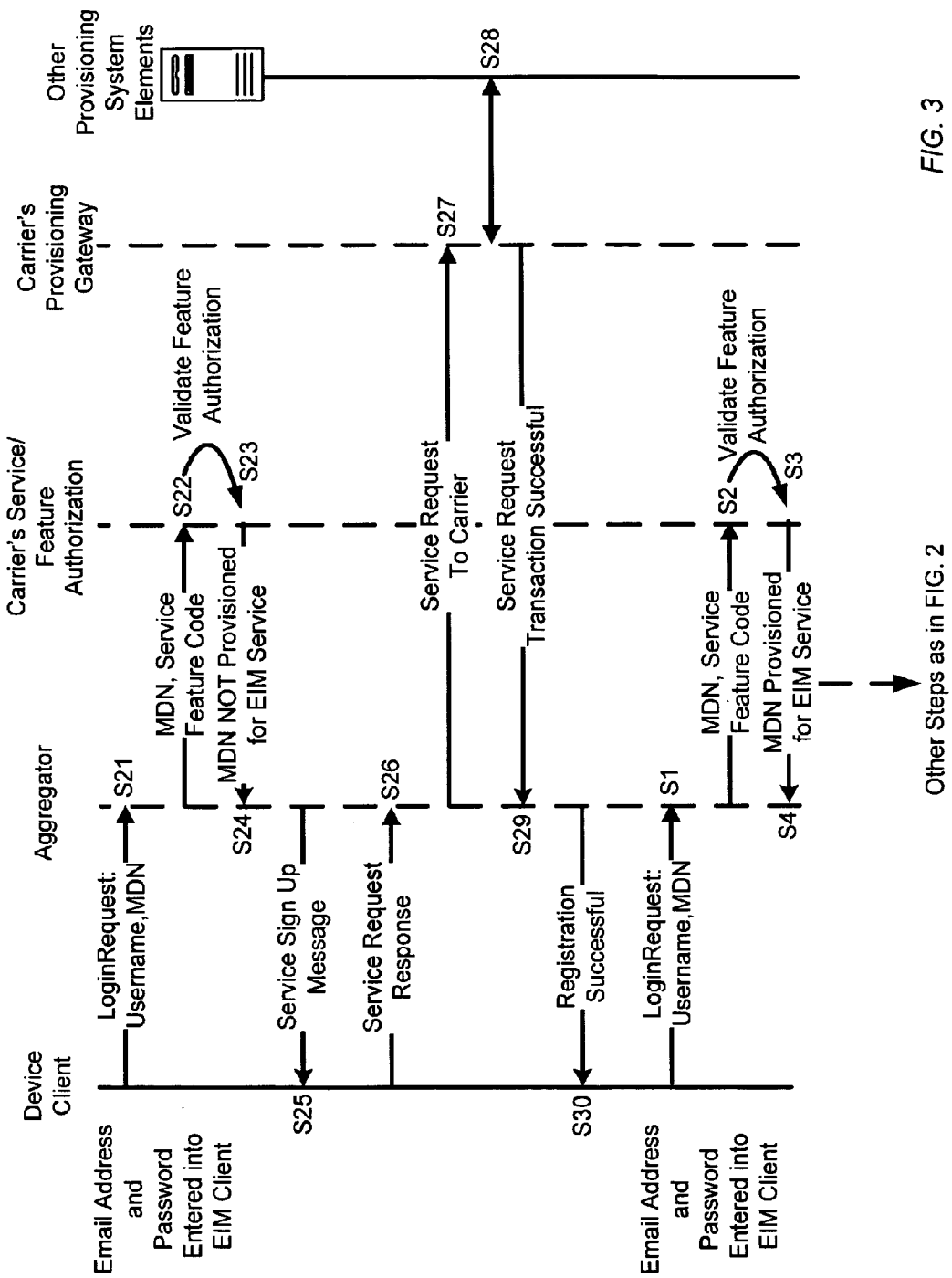
FIG. 3 is a signal flow diagram illustrating a self-provisioning of a mobile station, for enterprise IM communication through the aggregator.

As noted earlier, the aggregator 21 for the EIM service also supports service provisioning in the wireless network 10. It may be helpful at this point to consider an example of a call flow, in which the user can self-provision the mobile device client for the EIM service through the network 10, as outlined in the signal flow diagram of FIG. 3.

In a manner similar to the earlier example, assume communication begins after the user has activated the appropriate IM communication client application on the user's mobile station 15 or 17. The device client application provides an appropriate display, and in response, the user inputs the user's email address and password into the client application. The email address is used as a username. In response, the device client sends a log-in request to the aggregator 21 (at step S21), as in step S1 in the example of FIG. 2. The request message from the device client will include information about the mobile station as well as the user, for example, the mobile directory number (MDN) assigned to the particular mobiles station 15 or 17 as well as the username (email address) and password.

The aggregator 21 again will attempt to validate the wireless device to ensure that the mobile station 15 or 17 that is accessing the service is authorized to do so. To perform the validation, the service control 27 uses information from the login request to formulate an authorization query; and at step S22, the service control 27 in the aggregator 21 sends this authorization query to the element 41 that performs the carrier's service authorization function. The carrier's service/feature authorization element uses the MDN to look-up a service profile for the particular mobile station, and it uses the feature code to determine whether or not the profile shows that the particular mobile station is authorized to access the EIM service via the network 10 (step S23). In this second example, assume however that the validation at S3 is unsuccessful because the mobile station is not yet provisioned to receive the EIM service through the network 10.

Based on the result of the authorization determination at S23, the carrier's service/feature authorization element 41 will respond to the initial query message (from step S22). However, in this example, since the mobile station is not yet authorized to use the EIM service, the authorization element sends back a message (at S24) informing the service control 27 in the aggregator that the MDN (and thus the particular mobile station) is not provisioned for the EIM service. Hence, at S25, service control 27 in the aggregator 21 sends a message back to the device client requesting that the user sign-up for the EIM service/feature on-line, and the device client causes the mobile station to present the message to the user. Assuming that the user agrees to sign-up for the service, the user inputs appropriate information, and the device client causes the mobile station to initiate a service request transmission in step S26, which the aggregator 21 routes to the carrier's provisioning gateway (gateway 45 in FIG. 1) in step S27. The gateway provides an interface to other provisioning element(s) 47 for interaction with the user (S28) to activate the service with respect to the user and the user's mobile station. Although not separately shown, when completed, the provisioning system may enter the EIM feature code in the user/mobile station profile in the element 41 performing the carrier's service/feature authorization. Provisioning data also may be downloaded into the mobile station. When the provisioning activity with the user is successfully completed, the gateway sends a message indicating successful completion back to the aggregator in step S29, and the aggregator 21 routes that message through to the device client on the user's mobile station in step S30.

Once successfully provisioned, the user can now access the EIM service via the network 11. Hence, the further communications involve another user login attempt starting with steps S1-S3 and continuing with the additional steps discussed above relative to FIG. 2.

The aggregator and the associated techniques described herein can be used for other services that require a secure messaging environment with a limited user access.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3DES (or TDES)—Triple Data Encryption Algorithm
3GPP2—3rd Generation Partnership Project 2
AAA—Authentication, Authorization and Accounting
AES—Advanced Encryption Standard
BREW—Binary Runtime Environment for Wireless
CSP—Client Server Protocol
EDR—Electronic Data Reporting
EIM—Enterprise Instant Messaging
EVDO—Evolution Data Optimized
GSM—Global System for Mobile
IM—Instant Messaging
IP—Internet Protocol
LCS—Live Communications Server
MDN—Mobile Directory Number
PDA—Personal Digital Assistant
RSA—Rivest, Shamir and Adleman encryption
SMS—Short Message Service
TDMA—Time Division Multiple Access
VPN—Virtual Private Network
WDN—Wireless Data Network

What is claimed is:

1. A method of providing enterprise instant messaging (IM) service for a mobile station through a mobile wireless communication network, the method comprising:

receiving a request for enterprise service from the mobile station, in an IM service control element of the mobile wireless communication network;

determining whether the mobile station is authorized to utilize the enterprise IM service through the mobile communication network;

in response to a determination that the mobile station is authorized to utilize the enterprise IM service through the mobile communication network, encrypting and forwarding login information of a user of the mobile station to an IM server of one of a plurality of enterprise communities served through the mobile wireless communication network for enterprise validation of user authentication;

receiving an indication of successful validation of the user of the mobile station from the IM server, and in response, providing a key of the IM service control element of the mobile wireless communication network to the mobile station for use in encrypted communication of a security key of the mobile station through the mobile wireless communication network to the IM server as part of a login of the mobile station with the IM server; and transporting encrypted communications of IM messages through the mobile wireless communication network at least between the mobile station and the IM server, wherein at least one of the communications of IM messages is encrypted with the security key of the mobile station.

2. The method of claim 1, wherein:

the security key is a security key of the mobile station for encryption in accord with a first encryption algorithm;

the encrypting of the login information uses a public security key for the first encryption algorithm associated with the IM server; and the providing of the key to the mobile station involves encrypting the key in accord with a second encryption algorithm.

3. The method of claim 2, wherein:

the second encryption algorithm implements Rivest, Shamir and Adleman (RSA) encryption; and the first encryption algorithm implements Advanced Encryption Standard encryption or encryption in accord with a Triple Data Encryption Algorithm.

4. The method of claim 1, wherein:

the received request includes a username for the user of the mobile station; and forwarding of the login information of the user comprises identifying the one enterprise community with which the username is associated.

5. The method of claim 4, wherein:

the username comprises an email address for the user of the mobile station; and the one enterprise community is identified by a domain name portion of the email address for the user.

6. The method of claim 4, further comprising:

receiving another request for enterprise service from another mobile station, in the IM service control element of the mobile wireless communication network;

determining whether or not the other mobile station is authorized to utilize the enterprise IM service through the mobile communication network; and in response to a determination that the other mobile station is not authorized to utilize the enterprise IM service through the mobile communication network, sending a message through the mobile communication network to the other mobile station to initiate provisioning of the other mobile station for enterprise IM service through the mobile communication network.

7. A method of providing enterprise instant messaging (IM) service for a mobile station through a mobile wireless communication network, the method comprising:

receiving a first request for enterprise service from the mobile station, in an IM service control element of the mobile wireless communication network;

determining whether or not the mobile station is authorized to utilize the enterprise IM service through the mobile communication network;

in response to a determination that the mobile station is not authorized to utilize the enterprise IM service through the mobile communication network, initiating a communication between the mobile station and a provisioning system of the carrier providing the IM service through the mobile wireless communication network, to provision the mobile station for enterprise IM service through the mobile communication network; and after successful completion of communication to provision the mobile station for enterprise IM service, establishing a two-way encrypted secure communication link through the mobile communication network, between an IM server of an identified one of a plurality of enterprise IM communities served by the network and the mobile station for exchange of encrypted IM message payload data.

8. The method of claim 7, wherein the establishing of the two-way encrypted secure communication comprises:
   receiving a second request for enterprise service from the mobile station, in the IM service control element of the mobile wireless communication network;
   checking whether or not the mobile station is authorized to utilize the enterprise IM service through the mobile communication network; and
   upon determining that the mobile station is authorized to utilize the enterprise IM service through the mobile communication network, establishing the two-way encrypted secure communication link through the mobile communication network, between the IM server of the identified enterprise IM community and the mobile station for the exchange of the encrypted IM message payload data.

* * * * *